US008365379B2

(12) United States Patent
Mueller

(10) Patent No.: US 8,365,379 B2
(45) Date of Patent: Feb. 5, 2013

(54) DISMOUNTING DEVICE FOR BEARINGS

(75) Inventor: Michael Mueller, Bad Staffelsdein (DE)

(73) Assignee: Mueller-Kueps, L.P., Tucker, GA (US)

( * ) Notice: Subject to any disclaimer, the term of this patent is extended or adjusted under 35 U.S.C. 154(b) by 366 days.

(21) Appl. No.: 12/854,986

(22) Filed: Aug. 12, 2010

(65) Prior Publication Data

US 2012/0036690 A1 Feb. 16, 2012

(51) Int. Cl.
*B23P 19/02* (2006.01)
*B23P 19/00* (2006.01)

(52) U.S. Cl. .......................................... 29/261; 29/255

(58) Field of Classification Search .................... 29/261, 29/255, 278, 262, 259, 260, 246
See application file for complete search history.

(56) References Cited

U.S. PATENT DOCUMENTS

| | | | | | |
|---|---|---|---|---|---|
| 1,343,661 | A | * | 6/1920 | Crim et al. | 29/261 |
| RE15,936 | E | * | 10/1924 | Erickson et al. | 29/261 |
| 1,782,037 | A | * | 11/1930 | Grebenstein | 29/261 |
| 1,794,494 | A | * | 3/1931 | Noble | 29/261 |
| 1,890,369 | A | * | 12/1932 | Cook | 29/246 |
| 1,925,634 | A | * | 9/1933 | Hall | 29/261 |
| 2,262,969 | A | * | 11/1941 | Schultz | 29/261 |
| 2,303,560 | A | * | 12/1942 | Knight | 29/261 |
| 2,427,948 | A | * | 9/1947 | Cornwell | 29/261 |
| 2,697,273 | A | * | 12/1954 | Clarke et al. | 29/261 |
| 2,835,207 | A | * | 5/1958 | Hayes | 104/258 |
| 3,103,740 | A | * | 9/1963 | Crenshaw | 29/261 |
| 3,215,464 | A | * | 11/1965 | Overman | 294/90 |
| 3,551,988 | A | * | 1/1971 | Berbel et al. | 29/259 |
| 3,593,402 | A | * | 7/1971 | Mori | 29/256 |
| 4,649,615 | A | * | 3/1987 | Hundley | 29/261 |
| 4,691,424 | A | * | 9/1987 | Schmidt et al. | 29/261 |
| 4,745,671 | A | * | 5/1988 | Shannon | 29/254 |
| 7,653,975 | B2 | * | 2/2010 | Hu | 29/259 |
| 7,770,277 | B2 | * | 8/2010 | Wridt | 29/261 |

* cited by examiner

*Primary Examiner* — Phi Dieu Tran A
(74) *Attorney, Agent, or Firm* — Rosenberg, Klein & Lee

(57) ABSTRACT

A bearing dismounting device includes a body, a rod, several clamping arms, a tightening element, and an adjusting element. Each of the clamping arms is pivotally installed around the body. The center of the body has a through hole for the rod to mount therein. One end of the rod has a positioning part, and its other end has an operating part. Each of the clamping arms extends a buckling part. The central position on the outer side of each of the clamping arms has an accommodating part. The tightening element surrounds the accommodating parts of the clamping arms. Both ends of the tightening element have an adjusting element, respectively, for urging against the tightening element, thereby positioning the clamping arms.

2 Claims, 6 Drawing Sheets

DISMOUNTING DEVICE FOR BEARINGS

BACKGROUND OF THE INVENTION

1. Field of Invention

The invention relates to a dismounting device and, in particular, to a device that dismount a bearing from an axle.

2. Related Art

Traditionally, one often uses a hammer to hit a bearing in order to dismount it from an axle. However, such a method may easily make the bearing oblique with respect to the axle, making it more difficult to dismount. Moreover, if the bearing is still in good condition and is only dismounted for other purposes, hitting the bearing is likely to cause damages thereon. Apparently, the conventional bearing dismounting method needs to be improved.

SUMMARY OF THE INVENTION

An objective of the invention is to provide a bearing dismounting device that uses three clamping arms to hold the bearing. The positioning part of a rod urges against the end of the axle where the bearing is mounted. By hitting the end of the axle, the bearing gradually parts from the axle. This mechanism can readily dismount the bearing without damaging it.

To achieve the above-mentioned objective, the disclosed bearing dismounting device includes: a body, a rod, at least three clamping arms, and a tightening element.

The body has at least three pivotal connecting parts around it corresponding to the clamping arms. The center of the body has a through hole. The rod goes through the through hole of the body. Both ends of the rod are on opposite sides of the body. One end of the rod has a conic positioning part, and the other end has an operating part. One end of each of the clamping arms is pivotally connected to the pivotal connecting part via a pivotal connecting element. The other end has a buckling part toward the axial direction of the through hole on the body and on the same side of the positioning part of the rod. An accommodating part is provided between the pivotal connecting position of each of the clamping arms and the buckling part and on the outer side of the clamping arm. The tightening element surrounds the accommodating parts of the three clamping arms. Both ends of the tightening element have an adjusting element, respectively, to urge against the tightening element, thereby positioning the three clamping arms.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
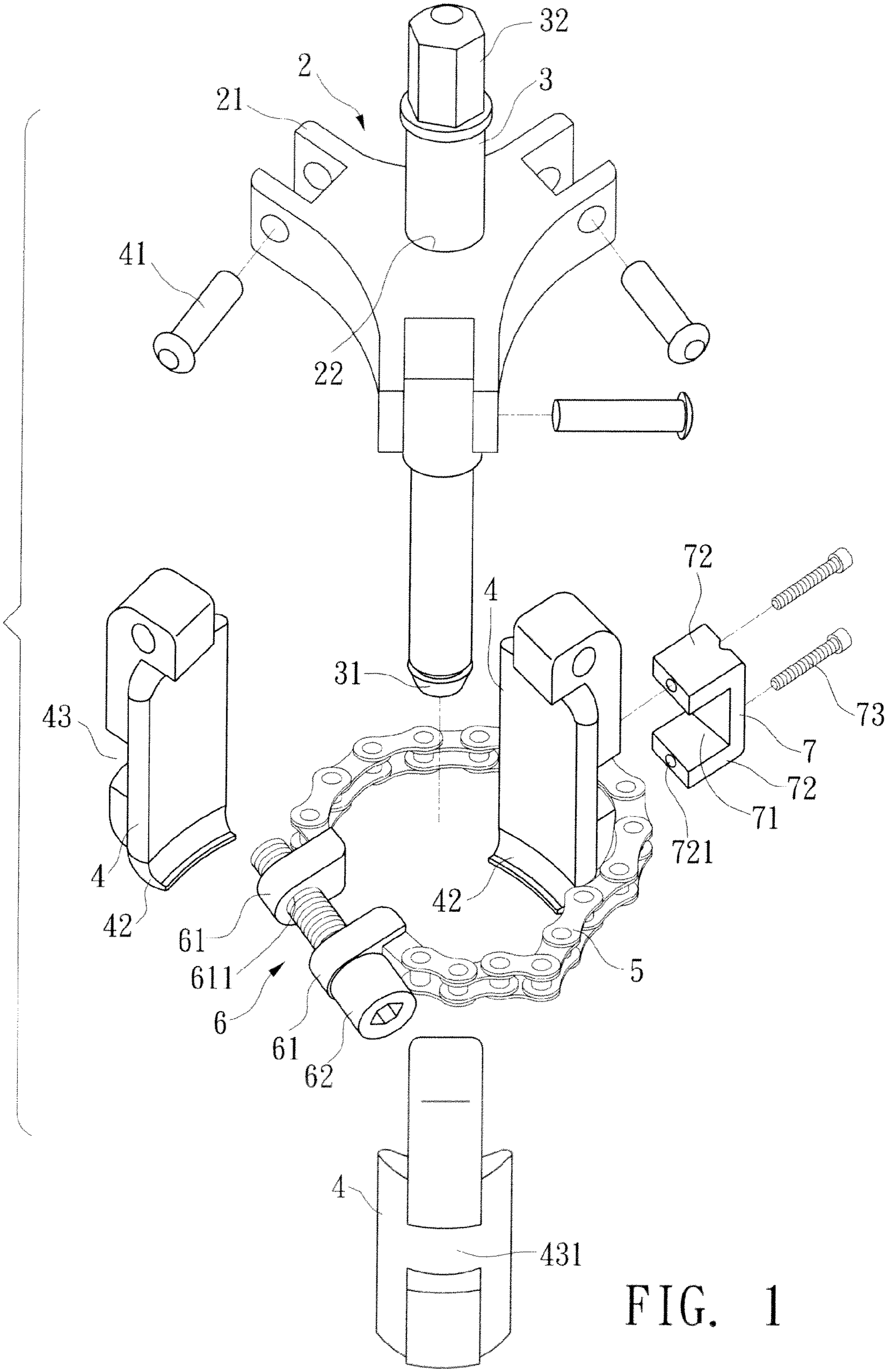
FIG. 1 is a three-dimensional exploded view of the invention.
Figure 2:
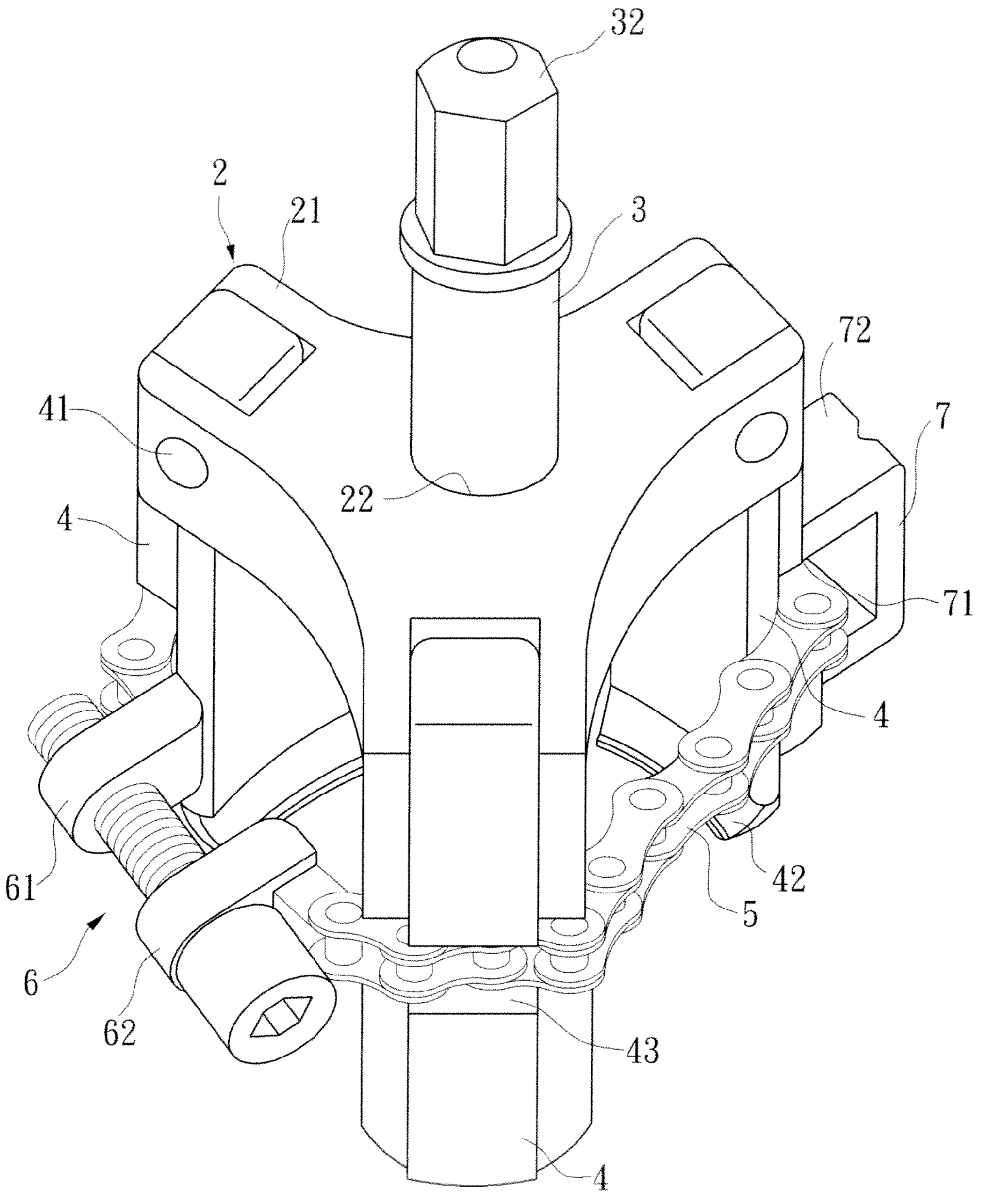
FIG. 2 is a three-dimensional assembly view of the invention.
Figure 3:
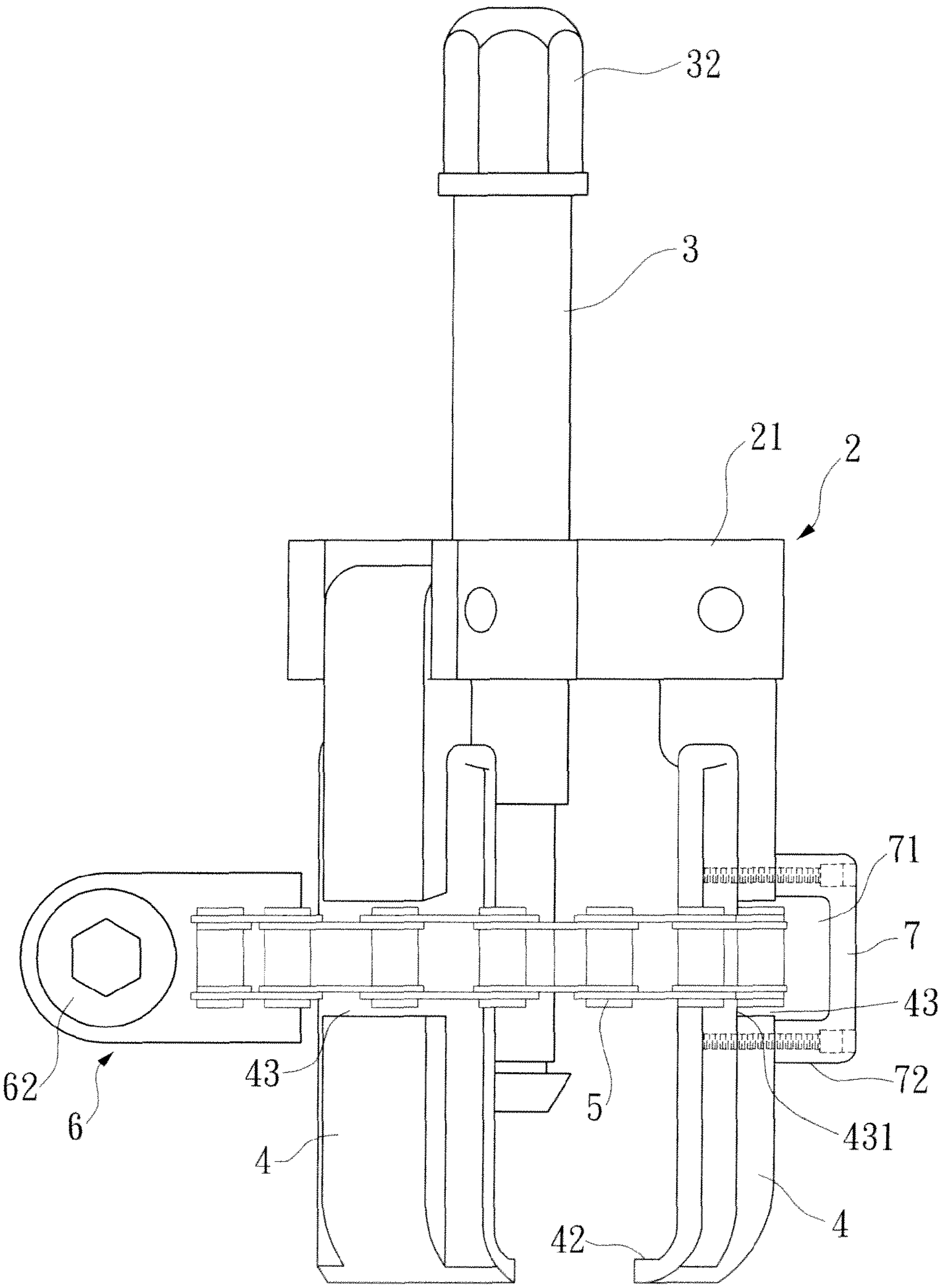
FIG. 3 is a side view of the invention.

Please refer to FIGS. 1 to 3 for an embodiment of the disclosed bearing dismounting device. It is used to dismount a bearing 12 mounted on an axle 11. The dismounting device includes: a body 2, a rod 3, at least three clamping arms 4, and a tightening element 5.

The body 2 has at least three pivotal connecting parts 21 separated at equal space for the clamping arms 4. For example, each neighboring two pivotal connecting parts are separated by 120 degrees. The center of the body 2 has a through hole 22.

The rod 3 goes through the through hole 22 of the body 2. Both ends of the rod 3 are on opposite sides of the body 2. One end of the rod 3 has a conic positioning part 31, and the other end has an operating part 32.

One end of each of the clamping arms 4 is pivotally connected to the pivotal connecting part 21 on the body 2 via a pivotal connecting element 41. The other end has a buckling part 42 toward the axial direction of the through hole 22 of the body 2 and on the same side of the positioning part 31 of the rod 3. An accommodating part 43 is provided between the pivotal connecting position of each of the clamping arms 4 and the buckling part 42 and on the outer side of the clamping arm 4.

The tightening element 5 surrounds the accommodating parts 43 of the three clamping arms 4. Both ends of the tightening element 5 have an adjusting element, respectively, to urge against the tightening element 5, thereby positioning the three clamping arms 4. In this embodiment, the inner surface of the accommodating part 43 is a circularly curved surface 431. The tightening element 5 urges against the circularly curved surface 431 of the accommodating part 43.

Besides, the tightening element is made of a metal, such as a chain. The adjusting element 6 includes two blocks 61 and a first screw bar 62. The two blocks 61 connect to both ends of the tightening element 5. Each of the blocks has a first screw hole 611. The first screw bar 62 goes into the first screw holes 611 of the two blocks 61. Turning the first screw bar 62 can adjust the tightness of the tightening element 5.

On the side of the tightening element 5 opposite to the adjusting element 6 is provided with a fixing element 7. The fixing element 7 has a concave part 71 corresponding to the accommodating part 43 of the clamping arm 4. A connecting section 72 is formed above and below the concave part 71, respectively. Each of the connecting sections 72 is formed with a second screw hole 721 horizontally. Each of the second screw holes 721 is inserted by a second screw bar 73. The second screw bar 73 is further screwed above and below the accommodating part 43. This limits the tightening element 5 above the clamping arm 4. Even when dismounting the adjusting element 6 and thus loosening the tightening element 5, the tightening element 5 would not fall from the clamping arm 4.

Figure 4:
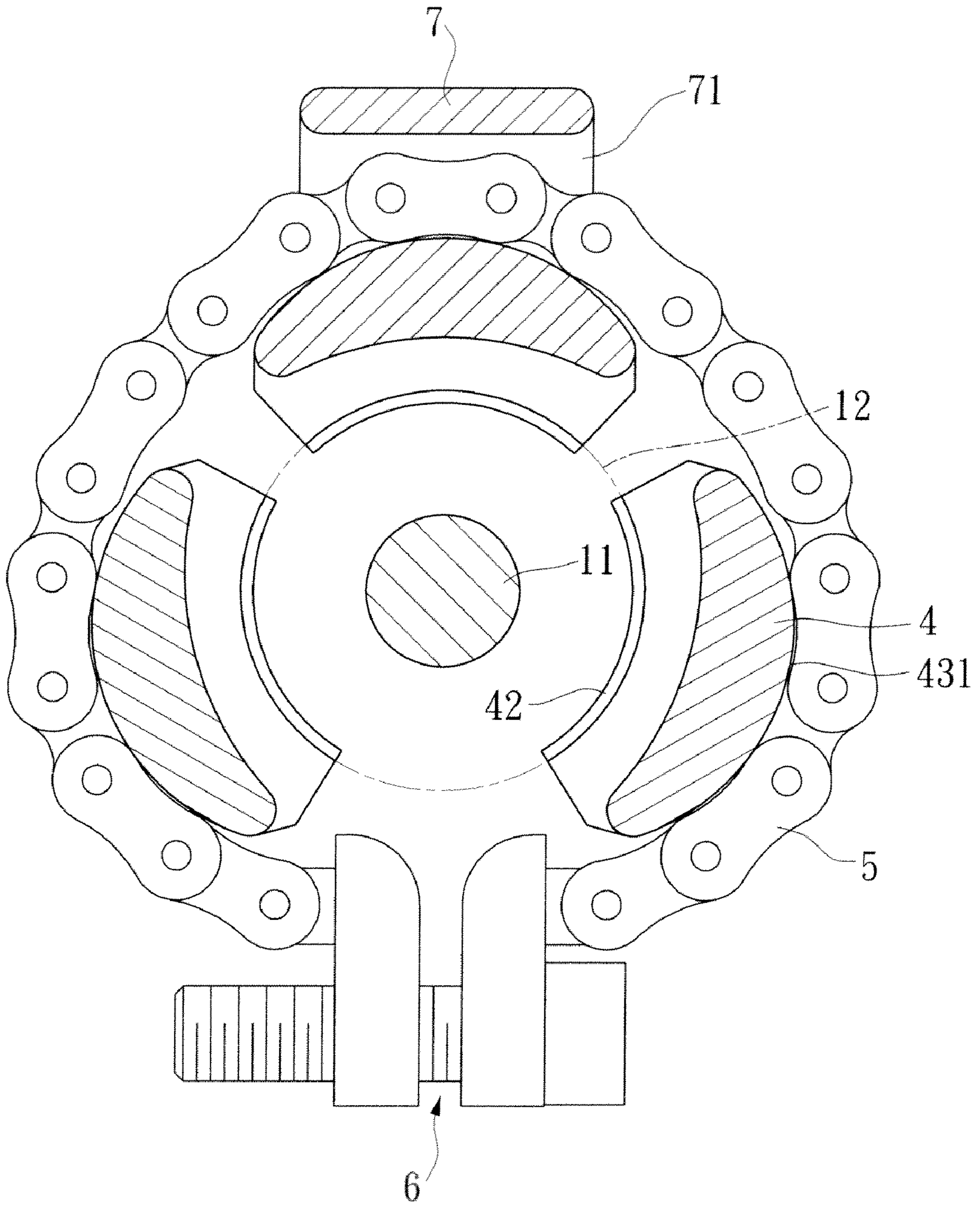
FIG. 4 is a bottom view when the tightening element of the invention holds the clamping arms tightly.
Figure 5:
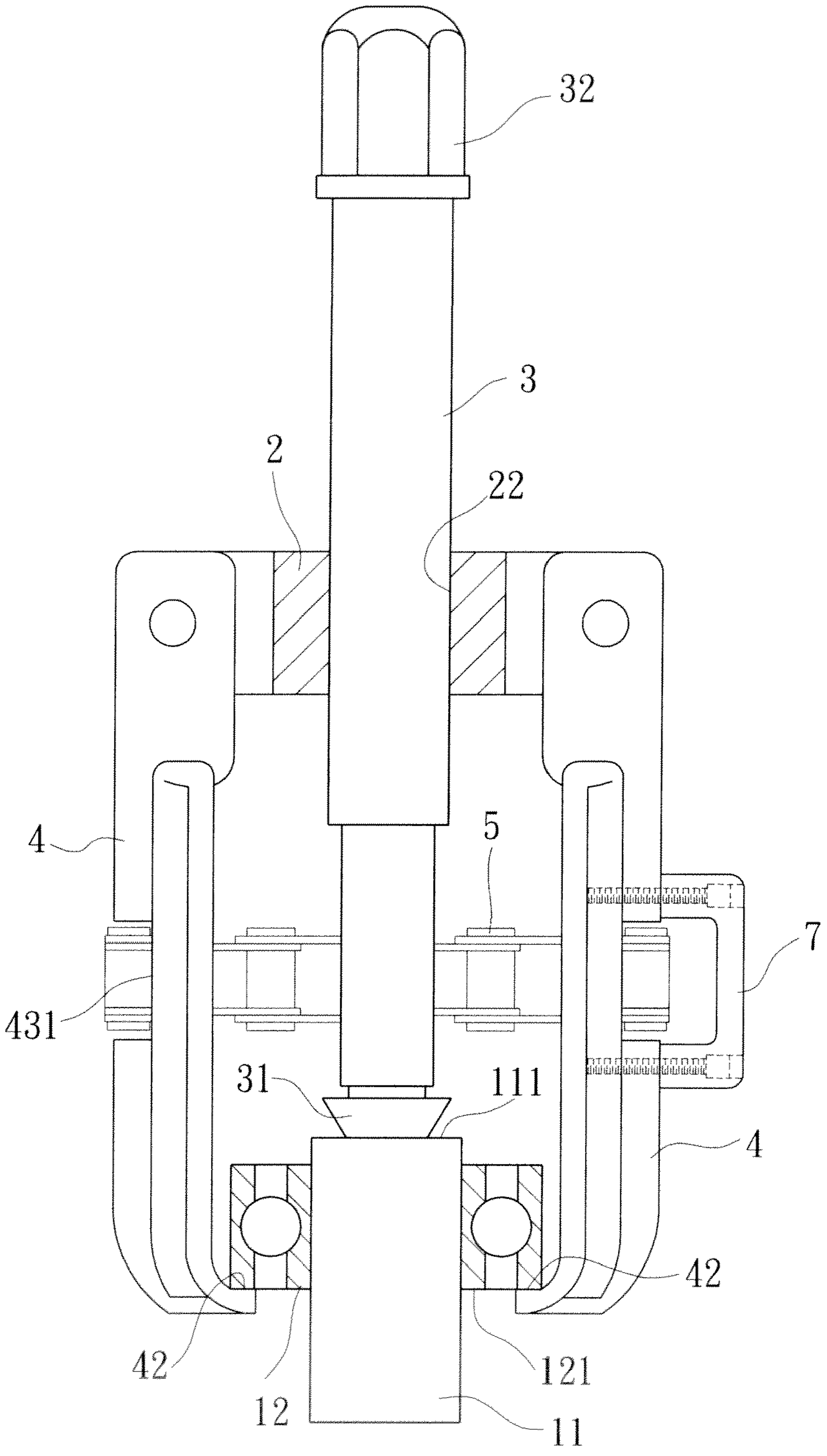
FIG. 5 is a schematic view showing the invention and the bearing before it is dismounted.
Figure 6:
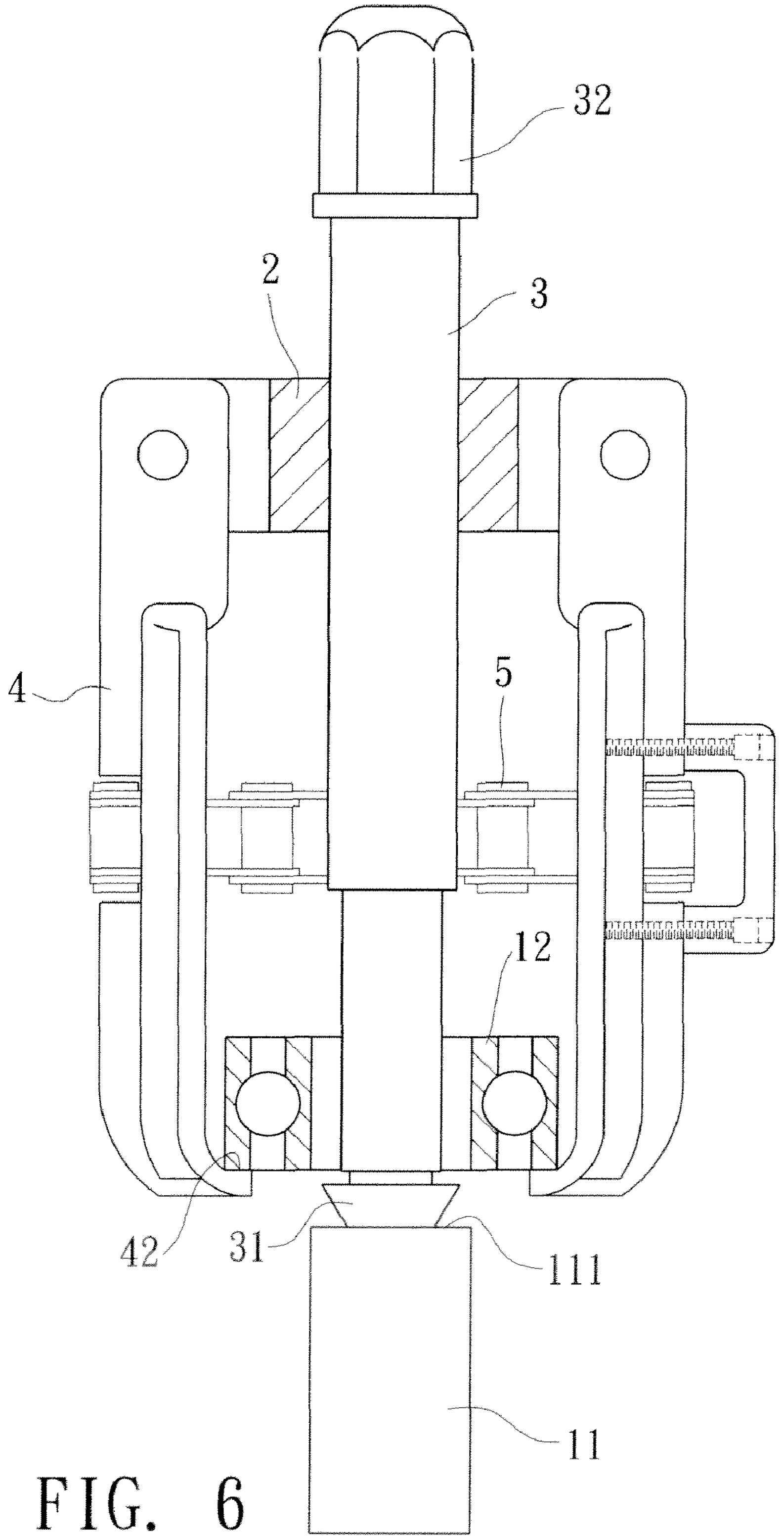
FIG. 6 is a schematic view showing the invention and the bearing after it is dismounted.

Please refer to FIGS. 4 to 6. To use the device, the user first slightly turns the clamping arms 4 open. Afterwards, the buckling part 42 of each of the clamping arms 4 urges inward against the surrounding of the surface 121 of the bearing 12 that is farther from the body 2. At the same time, the inner side of each of the clamping arms 4 gets close to the surrounding of the bearing 12. The first screw bar 62 of the adjusting element 6 is turned tight, so that there is an urging effect from the tightening element 5 toward the accommodating parts 43 of the clamping arms 4. This mechanism firmly restricts the three clamping arms 4 that are holding the bearing 12, preventing them from falling off in the subsequent dismounting task. Afterwards, the positioning part 31 of the rod 3 is made to urge against the end portion 111 of the axle 11 on which the beating 12 is mounted. One then uses a hitting tool, such as a hammer, to hit the operating part 32 of the rod 3. Under continuous hits, the rod 3 gradually departs from the bearing 12. Eventually, the bearing completely parts from the axle 11.

In summary, the invention uses the three clamping arms and the tightening element to firmly hold the bearing. By continuously hitting the rod, the axle is pushed to depart from the bearing gradually. Apparently, the invention has the feature that the bearing can be quickly and conveniently removed without being damaged in comparison with the prior art.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A bearing dismounting device, comprising:

a body having at least three pivotal connecting parts at equal spacing around it and a through hole at its center;

a rod going through the through hole of the body, whose both ends are on opposite sides of the body with one end having a conic positioning part and the other end having an operating part;

at least three clamping arms, one end of each of which is pivotally connected to the pivotal connecting part of the body via a pivotal connecting element and the other end has a buckling part toward the axial direction of the through hole of the body and on the same side of the positioning part of the rod, wherein an accommodating part is formed between the pivotal connecting position of each of the clamping arm and the buckling part and on the outer side of the clamping arm; and a tightening element surrounding the accommodating parts of the three clamping arms, with an adjusting element provided on opposite ends thereof for tightening and positioning the three clamping arms.

2. The bearing dismounting device of claim 1, wherein the inner surface of the accommodating part is a circularly curved surface and the tightening element urges against the circularly curved surface.

* * * * *